United States Patent
Shin (10) Patent No.: US 9,781,359 B2
(45) Date of Patent: Oct. 3, 2017

(54) APPARATUS AND METHOD FOR PROCESSING IMAGE

(71) Applicant: HYUNDAI MOTOR COMPANY, Seoul (KR)

(72) Inventor: Dongsoo Shin, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/925,935

(22) Filed: Oct. 28, 2015

(65) Prior Publication Data
US 2016/0142651 A1  May 19, 2016

(30) Foreign Application Priority Data

Nov. 17, 2014  (KR) .................. 10-2014-0160305

(51) Int. Cl.
| | |
|---|---|
| *H04N 5/272* | (2006.01) |
| *H04N 5/225* | (2006.01) |
| *G06T 5/20* | (2006.01) |
| *G06K 9/00* | (2006.01) |
| *G06K 9/20* | (2006.01) |

(52) U.S. Cl.
CPC ......... *H04N 5/272* (2013.01); *G06K 9/00208* (2013.01); *G06K 9/00355* (2013.01); *G06K 9/00375* (2013.01); *G06K 9/2018* (2013.01); *G06K 9/2027* (2013.01); *G06T 5/20* (2013.01); *H04N 5/2256* (2013.01); *H04N 5/2258* (2013.01); *G06T 2207/20224* (2013.01)

(58) Field of Classification Search
CPC ...... H04N 5/272; H04N 5/2258; H04N 13/02; H04N 5/2256; H04N 5/378; G06T 5/20; G06T 2207/20224; G06K 9/6202
See application file for complete search history.

(56) References Cited

U.S. PATENT DOCUMENTS 8,203,614 B2 * 6/2012 Fukuda .................... H04N 7/18
348/208.4
9,088,725 B2 * 7/2015 Hataguchi ............ H04N 5/2353
(Continued)

FOREIGN PATENT DOCUMENTS

| JP | 2007-164804 A | 6/2007 |
|---|---|---|
| JP | 2009-301494 A | 12/2009 |
| JP | 2010-147877 A | 7/2010 |

(Continued)

OTHER PUBLICATIONS

Korean Office Action dated Sep. 17, 2015 issued in Korean Patent Application No. 10-2014-0160305 (English translation thereof).

*Primary Examiner* — Padma Haliyur
(74) *Attorney, Agent, or Firm* — McDermott Will & Emery LLP (57) ABSTRACT

An image processing apparatus includes a lighting unit configured to emit light to an object, a first image capturing unit configured to output a first image signal acquired by photographing the object when light is emitted by the lighting unit, a second image capturing unit configured to output a second image signal acquired by photographing the object when no light is emitted by the lighting unit, and a controller configured to acquire an object image by using a difference image between a first image generated based on the first image signal and a second image generated based on the second image signal.

19 Claims, 8 Drawing Sheets

(56) References Cited

U.S. PATENT DOCUMENTS

2009/0051651 A1\* 2/2009 Han ................. H04N 21/42221
 345/158
2014/0375821 A1\* 12/2014 Wu ......................... G06T 7/408
 348/164

FOREIGN PATENT DOCUMENTS

JP 2011-114823 A 6/2011
KR 10-2013-0135305 A 12/2013

\* cited by examiner

APPARATUS AND METHOD FOR PROCESSING IMAGE

CROSS-REFERENCE TO RELATED APPLICATION(S)

This application claims the benefit of Korean Patent Application No. 10-2014-0160305, filed on Nov. 17, 2014 in the Korean Intellectual Property Office, the disclosure of which is incorporated herein by reference.

BACKGROUND

1. Technical Field

The present disclosure relates to apparatuses and methods for processing an image to remove a background from an input image.

2. Description of the Related Art

Image recognition technology to acquire images and recognize the acquired images has been applied to a variety of fields. For example, the image recognition technology has been applied to touchscreens to judge a user's touch based on sequentially acquired images of the user's hand, to automobiles to recognize a gesture of a user and provide predetermined feedback in accordance with the recognized gesture of the user, and to the like.

For image recognition, there is a need to remove a background from an object to be recognized. The background may be removed using various methods such as a static removal method using a pre-stored background image, a difference image method by acquiring and using a plurality of images, and a depth map method using a stereo camera.

According to the static removal method, a background is removed from an object by removing a pre-stored background image from an acquired image. The static removal method has a low degree of adaptability to external disturbing light and a low ability to recognize the object in low-light environments.

According to the method using a depth map, a background is removed based on a depth map calculated using stereo images simultaneously acquired by a stereo camera. However, since a lot of computations are required to calculate the depth map, high performance hardware is required to calculate the depth map. Also, the method using the depth map has a low degree of adaptability to external disturbing light.

According to the difference image method, a background is removed from an object by using a difference between an image acquired when a lighting unit is turned on and an image acquired when the lighting unit is turned off. The difference image method has a high degree of adaptability to external disturbing light and shadow removing effects. However, since accuracy of removing the background according to the difference image method is affected by a shutter speed of a camera, a high quality camera is required to increase accuracy.

SUMMARY

Therefore, it is an aspect of the present disclosure to provide apparatuses and methods for processing an image to generate an image from which a background is removed.

Additional aspects of the disclosure will be set forth in part in the description which follows and, in part, will be obvious from the description, or may be learned by practice of the disclosure.

In accordance with another aspect of the present disclosure, an image processing apparatus includes a lighting unit configured to emit light to an object, a first image capturing unit configured to output a first image signal acquired by photographing the object when light is emitted, a second image capturing unit configured to output a second image signal acquired by photographing the object when light is not emitted, and a controller configured to acquire an object image by using a difference image between a first image generated based on the first image signal and a second image generated based on the second image signal.

The first image capturing unit may generate the first image signal by receiving light for a first time period, and the second image capturing unit may generate the second image signal by receiving light for a second time period.

The lighting unit may emit light to the object only for a part of the first time period.

The lighting unit may emit light to the object for the first time period.

The lighting unit may not emit light for the second time period during which the second image capturing unit receives light.

The first image capturing unit may read out the first image signal generated by receiving light for the first time period and output the first image signal.

The reading out of the first image signal of the first image capturing unit and the receiving of light of the second image capturing unit may be simultaneously performed.

The first image capturing unit may read out the first image signal for the second time period during which the second image capturing unit receives light.

The controller may control a light emitting timing of the lighting unit to sequentially perform the receiving of light of the first image capturing unit and the receiving of light of the second image capturing unit.

The light may be infrared light.

The first image capturing unit and the second image capturing unit may include at least one selected from the group consisting of an infrared filter and an infrared film.

In accordance with another aspect of the present disclosure, a method of processing an image for object recognition by using a plurality of image sensors includes generating a first image signal by receiving light while a lighting unit emits light to an object at a first image sensor, generating a second image signal by receiving light while the lighting unit is turned off at a second image sensor, and acquiring an object image from which a background is removed based on the first image signal and the second image signal.

The acquiring of the object image may include generating a first image based on the first image signal, generating a second image based on the second image signal, and acquiring the object image by using a difference image between the first image and the second image.

The generating of the first image may include turning on the lighting unit.

The generating of the first image may include turning off the lighting unit.

The lighting unit may be turned off when the receiving of light at the first image sensor is terminated.

The generating of the first image signal may include reading out the first image signal at the first image sensor.

The reading out of the first image signal at the first image sensor and the receiving of light at the second image sensor may be simultaneously performed.

The generating of the second image signal may include reading out the second image signal at the second image sensor.

The reading out of the second image signal at the second image sensor and the receiving of light at the first image sensor may be simultaneously performed.

The light may be infrared light.

The generating of the first image signal may further include selecting infrared light received by the first image sensor by using an infrared filer or an infrared film, and the generating of the second image signal may further include selecting infrared light received by the first image sensor by using an infrared filer or an infrared film.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. The present disclosure may, however, be embodied in many different forms and should not be construed as being limited to the embodiments set forth herein; rather, these embodiments are provided so that this disclosure will be thorough and complete, and will fully convey the concept of the invention to those of ordinary skill in the art.

Hereinafter, the present disclosure will be described in detail by explaining exemplary embodiments of the present disclosure with reference to the attached drawings. In the drawings, parts unrelated to the descriptions are omitted for clear description of the disclosure.

Figure 1:
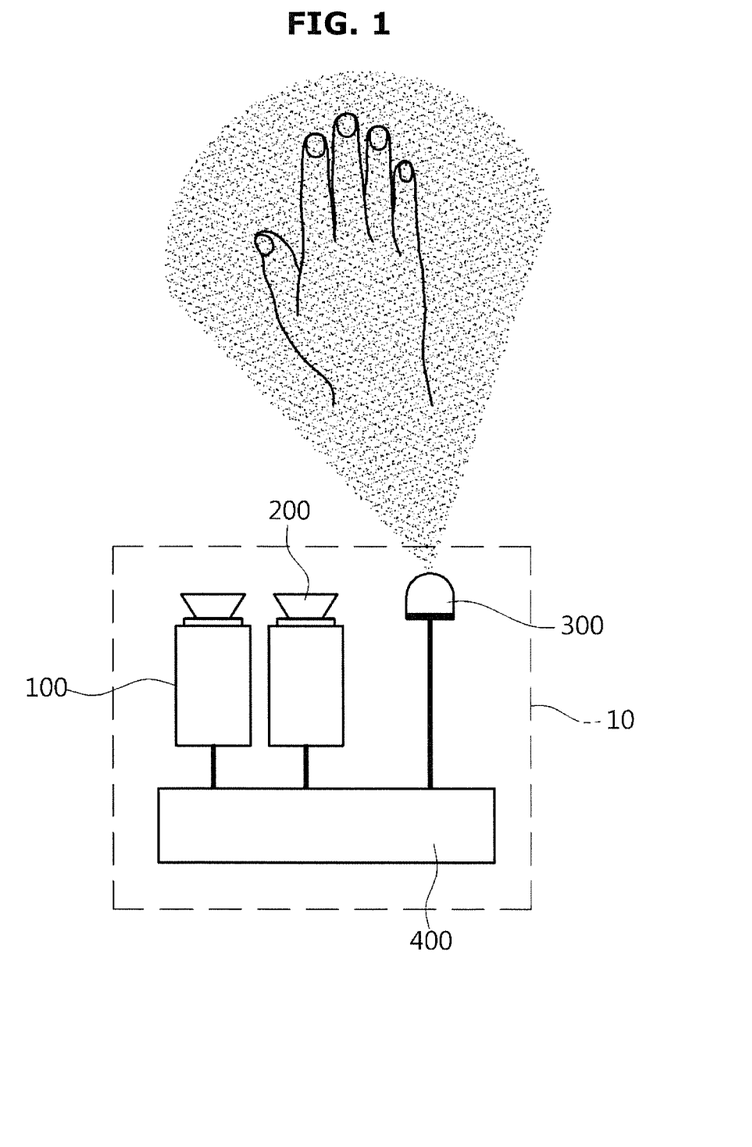
FIG. 1 is a diagram for schematically describing an image processing apparatus according to an exemplary embodiment.

FIG. 1 is a diagram for schematically describing an image processing apparatus 10 according to an exemplary embodiment.

Referring to FIG. 1, the image processing apparatus 10 includes a plurality of image capturing units 100 and 200 configured to acquire images, a lighting unit 300 configured to emit light, and a controller 400 configured to control constituent elements.

The image processing apparatus 10 acquires an image of an object. In this regard, the object is a subject to be recognized by the image processing apparatus 10, and examples of the object may include landscapes, views, things, human bodies, and parts of a human body, without being limited thereto.

The object to be recognized may be determined by the subject to be recognized. For example, when the subject to be recognized is a human gesture, the object may be a part of a human body such as hand, face, or pupil. Hereinafter, although a hand will be described as the object for convenience of explanation, the object may vary according to the subject of recognition as described above.

The image processing apparatus 10 may acquire an object image by using images sequentially acquired by the plurality of image capturing units 100 and 200. Here, the object image refers to an image including only the object, as the subject to be recognized, from which a background is removed. That is, when the object is a human's hand, the object image refers to an image of the hand from which the background is removed.

The plurality of image capturing units 100 and 200 may be arranged such that errors of images of the object acquired under the same conditions are minimized. For example, the plurality of image capturing units 100 and 200 may be arranged to be adjacent to each other as illustrated in FIG. 1.

The plurality of image capturing units 100 and 200 may include a first image capturing unit 100 that acquires an electric signal by receiving light in a lighting environment and a second image capturing unit 200 that acquires an electric signal by receiving light in a non-lighting environment. Hereinafter, the electric signal acquired by receiving light in a lighting environment is referred to as a first image signal, and the electric signal acquired by receiving light in a non-lighting environment is referred to as a second image signal.

That is, the first image capturing unit 100 converts light incident in a lighting environment into the first image signal and reads out and outputs the first image signal, and the second image capturing unit 200 converts light incident in a non-lighting environment into the second image signal and reads out and outputs the second image signal.

The lighting unit 300 emits light to the object. The lighting unit 300 may illuminates the object only when the first image capturing unit 100 receives light such that the first image capturing unit 100 acquires a clear object image.

Also, the lighting unit 300 may emit light at regular time intervals. For example, the lighting unit 300 may emit light to the object for a predetermined time period at a certain period. When the light is emitted to the object, the first image capturing unit 100 receives light, and when the light is not emitted to the object, the second image capturing unit 200 receives light.

The controller 400 acquires an object image by controlling the plurality of image capturing units 100 and 200 and the lighting unit 300. Particularly, the controller 400 may control the plurality of image capturing units 100 and 200 and the lighting unit 300 to sequentially acquire the first image signal and the second image signal by controlling a light emitting time of the lighting unit 300 and a light receiving time and a readout time of the plurality of image capturing units 100 and 200.

Then, based on the acquired first image signal and the second image signal, an object image from which the background is removed may be generated. Hereinafter, constituent elements of the image processing apparatus 10 will be described in detail.

Figure 2:
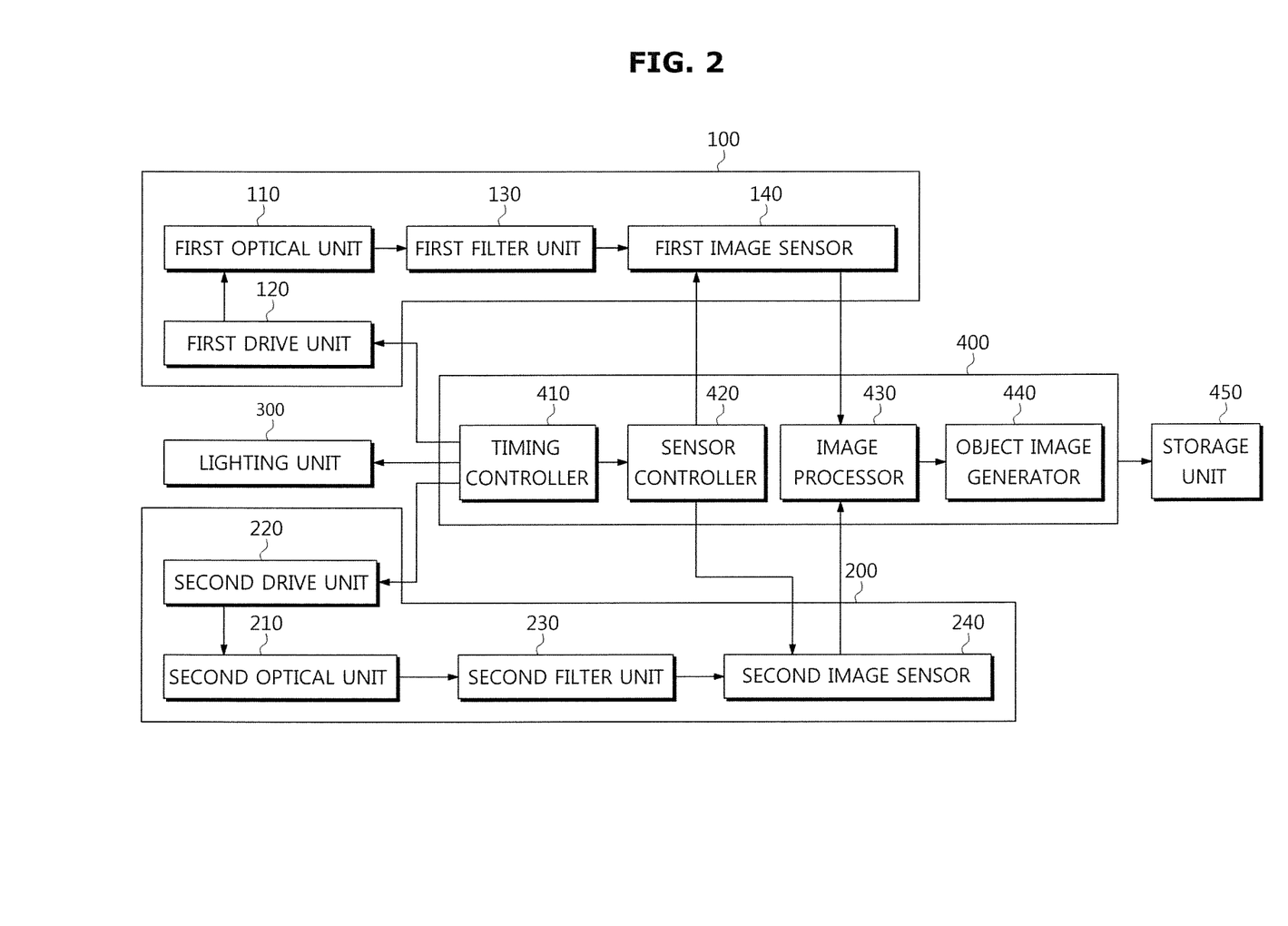
FIG. 2 is a control block diagram for describing an image processing apparatus according to an exemplary embodiment in detail.
Figure 3:
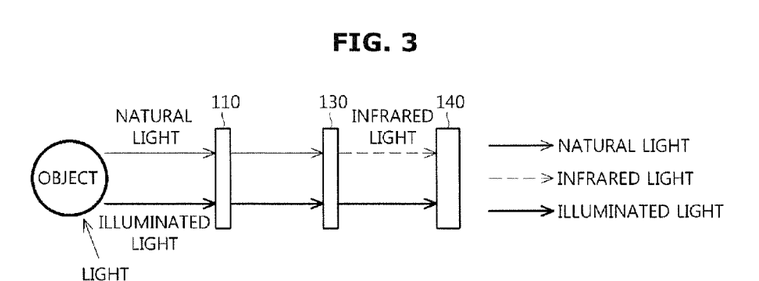
FIG. 3 is a diagram for describing light incident on a first image sensor of an image processing apparatus according to an exemplary embodiment.
Figure 4:
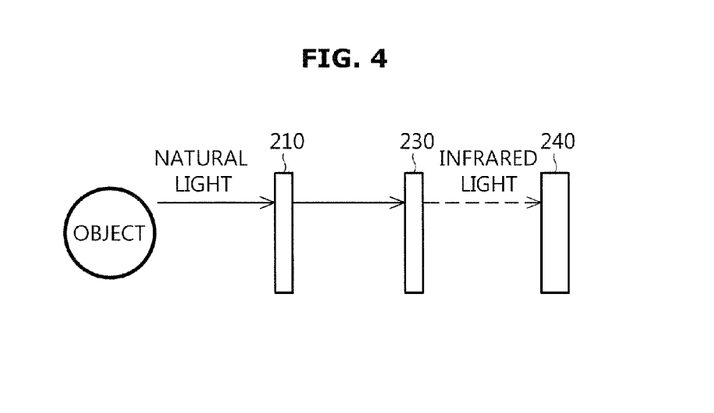
FIG. 4 is a diagram for describing light incident on a second image sensor of an image processing apparatus according to an exemplary embodiment.

FIG. 2 is a control block diagram for describing the image processing apparatus. FIG. 3 is a diagram for describing light incident on a first image sensor of the image processing apparatus. FIG. 4 is a diagram for describing light incident on a second image sensor of the image processing apparatus.

Referring to FIGS. 1 and 2, the lighting unit 300 emits light to the object. In this regard, the lighting unit 300 may generate light having a predetermined wavelength and may emit the generated light to the object. Although the wavelength of the light emitted by the lighting unit 300 is not limited, infrared light having different reflection characteristics from visible light may be used therefor. For example, the lighting unit 300 may be implemented as an infrared light source having a wavelength of 850 nm, 880 nm, or 940 nm and may emit infrared light to the object.

Also, the lighting unit 300 may emit light to the object while the first image capturing unit 100 receives light. To this end, a timing controller 410 may control the lighting unit 300 to emit light to the object for a predetermined time period at regular intervals. Here, the predetermined time period may be preset according to a light receiving time period of the first image capturing unit 100 and may also be dynamically determined according to driving of the first image capturing unit 100.

The first image capturing unit 100 may include a first optical unit 110, a first drive unit 120, a first filter unit 130, and a first image sensor 140.

The first optical unit 110 may control incidence of external light. Particularly, the first optical unit 110 may include a lens through which light passes and a shutter determining light transmission. The shutter is opened and closed by the first drive unit 120 to determine whether to receive light. In this regard, a higher shutter speed is required.

The first optical unit 110 may further include an aperture to adjust an amount of incident light or a focus lens to adjust a focus on an object. The aperture and the focus lens may be adjusted to acquire a clear object image. For example, the degree of opening of the aperture may vary in accordance with the amount of incident light.

The first drive unit 120 drives the first optical unit 110. Particularly, the first drive unit 120 may control opening and closing of the shutter of the first optical unit 110. When the shutter is opened, the first image sensor 140 receives light, and when the shutter is closed, the first image sensor 140 does not receive light. Accordingly, the light receiving time period of the first image sensor 140 may be adjusted by controlling opening and closing of the shutter. In this case, an opening/closing time of the shutter may be determined by the timing controller 410, which will be described later.

In addition, the first drive unit 120 may control the focus by moving a position of the lens of the first optical unit 110 or may control the amount of incident light by controlling opening and closing of the aperture.

The first filter unit 130 may transmit light having a predetermined wavelength by filtering light incident via the first drive unit 120. In this case, the first filter unit 130 may transmit only light having the same wavelength range as light emitted by the lighting unit 300. For example, when the lighting unit 300 emits infrared light, the first filter unit 130 may transmit only infrared light among incident light and may reflect or absorb visible light and ultraviolet light.

The first filter unit 130 may include a filter or film to select transmitted light. For example, the first filter unit 130 may transmit only infrared light by including an infrared filter or an infrared film. The infrared filter or film may transmit only infrared light, for example, light having a wavelength of 700 nm or greater. The infrared filter or film may be a band-pass infrared filter or film.

Meanwhile, although the first filter unit 130 is disposed next to the first optical unit 110 in FIG. 2, the first filter unit 130 may also be disposed prior to the first optical unit 110.

The first image sensor 140 converts incident light into the first image signal that is an electric signal and outputs the first image signal.

Referring to FIG. 3, the first image capturing unit 100 operates in a lighting environment. Thus, natural light and light emitted from the lighting unit 300 and reflected by the object are incident via the first optical unit 110 for a light receiving time period. The light reflected by the object is referred to as illuminated light.

Natural light and illuminated light that have passed through the first optical unit 110 pass through the first filter unit 130. In this case, only infrared light may pass through the first filter unit 130 by the infrared filter or film. That is, only infrared light among natural light may pass through the first filter unit 130.

Meanwhile, the first filter unit 130 may transmit all illuminated light. As described above, when light emitted by the lighting unit 300 is infrared light, illuminated light reflected by the object is also infrared light. Thus, all illuminated light may pass through the first filter unit 130.

That is, infrared light among natural light and illuminated light are incident on the first image sensor 140. The first image sensor 140 receives light having a wavelength corresponding to that of incident infrared light that has passed through the first filter unit 130, converts the light into the first image signal as an electric signal, and reads out the first image signal stored in a light receiving device when the receiving of light is terminated.

Particularly, the first image sensor 140 may include a light receiving device that converts the incident light into the electric signal, i.e., the first image signal and a readout circuit that reads out the first image signal of the light receiving device.

In this case, the light receiving device is implemented as a plurality of pixels, receives light incident on each pixel, generates an amount of electric charges corresponding to an intensity of the received infrared light, and stores the electric charges. Particularly, each pixel of the light receiving device may include a photodiode to generate electric charges corresponding to the intensity of incident infrared light and a capacitor to store the generated electric charges. In this regard, the electric charges stored in each pixel correspond to a pixel value of each pixel.

When the receiving of light receiving is terminated, the readout circuit sequentially reads out the electric charged stored in each pixel and outputs the first image signal. Here, the stored electric charges may be read out on the basis of pixel or on the basis of line including a plurality of pixels.

The first image signal output from the readout circuit corresponds to infrared light among natural light and illuminated light reflected by the object. The first image signal output from the readout circuit is transmitted to the controller 400.

For example, the first image sensor 140 may be implemented as a Complementary Metal Oxide Semiconductor (CMOS) image sensor or a Change Coupled Device (CCD) image sensor, without being limited thereto.

The second image capturing unit 200 may include a second optical unit 210, a second drive unit 220, a second filter unit 230, and a second image sensor 240.

The second optical unit 210 may determine incidence of external light. Particularly, the second optical unit 210 may include a lens and a shutter. Also, the second optical unit 210 may further include an aperture or a focus lens.

The second drive unit 220 drives the second optical unit 210. The second drive unit 220 may drive the second optical unit 210 in a manner similar to that of the first drive unit 120 as described above. The second drive unit 220 may drive the second optical unit 210 such that the second image sensor 240 receives light in the same environment as in the first optical unit 110. For example, the second drive unit 220 may drive the second optical unit 210 to correspond to a shutter speed, an aperture value, and a position of the focus lens of the first optical unit 110.

The second filter unit 230 may transmit only light having a predetermined wavelength by filtering light incident through the second drive unit 220. The second filter unit 230 may include the same filter or film as the first filter unit 130.

Meanwhile, although the second filter unit 230 is disposed next to the second optical unit 210, the second filter unit 230 may also be disposed prior to the second optical unit 210.

The second image sensor 240 converts incident light into a second image signal which is an electric signal and outputs the second image signal. The second image sensor 240 may be the same image sensor as the first image sensor 140, without being limited thereto.

Referring to FIG. 4, the second image capturing unit 200 operates in a non-lighting environment. Thus, only natural light is incident on the second image capturing unit 200.

Natural light that has passed through the second optical unit 210 is incident on the second filter unit 230. Since the second filter unit 230 transmits a wavelength corresponding to infrared light among the incident natural light, only infrared light among natural light is incident on the second image sensor 240.

The controller 400 controls the overall operation of the image processing apparatus 10. The controller 400 may be a single processor or a plurality of processors. In this case, the processor may be implemented as an array of a plurality of logic gates or a combination of a universal microprocessor and a memory storing a program executable in the microprocessor. The controller 400 may include a timing controller 410, a light receiving controller 420, an image processor 430, and an object image generator 440.

The timing controller 410 may control light receiving operations and readout operations of the first image capturing unit 100 and the second image capturing unit 200 such that the first image signal and the second image signal are sequentially output and may control a light emitting time of the lighting unit 300.

That is, the timing controller 410 may control the first image capturing unit 100, the second image capturing unit 200, and the lighting unit 300 such that a part of or the entire readout operation of the first image sensor 140 and a part of or the entire light receiving operation of the second image sensor 240 are performed simultaneously to acquire the first image signal and the second image signal at a minimized time interval.

In addition, the timing controller 410 may control the first image capturing unit 100, the second image capturing unit 200, and the lighting unit 300 such that the readout operation of the second image sensor 240 and the light receiving operation of the first image sensor 140 are simultaneously performed.

By simultaneously performing the light receiving operation and the readout operation by using the plurality of image sensors as described above, the first image signal and the second image signal may be acquired at a short time interval. Thus, the background may be efficiently removed even when the object moves. A timing control process in each of the constituent elements will be described later in more detail.

The sensor controller 420 may control the image sensor to operate in accordance with a control by the timing controller 410. Particularly, the sensor controller 420 control driving of the image sensor by initializing the pixel value of each pixel of the image sensor or by generating a control signal to control the light receiving operation and the readout operation of the image sensor.

The image processor 430 may generate an image based on the image signal output from the image sensor. Particularly, the image processor 430 generates a first image based on the first image signal output from the first image sensor 140 and may generate a second image based on the second image signal output from the second image sensor 240.

In addition, the image processor 430 may preprocess the first image signal and the second image signal. For example, the image processor 430 may remove noise from the first image signal and the second image signal or may correct an error caused by position difference between the first image capturing unit 100 and the second image capturing unit 200.

The object image generator 440 may acquire an object image based on a first image and a second image. Particularly, the object image generator 440 may generate an object image base on a different image between the first image and the second image.

Figure 5:
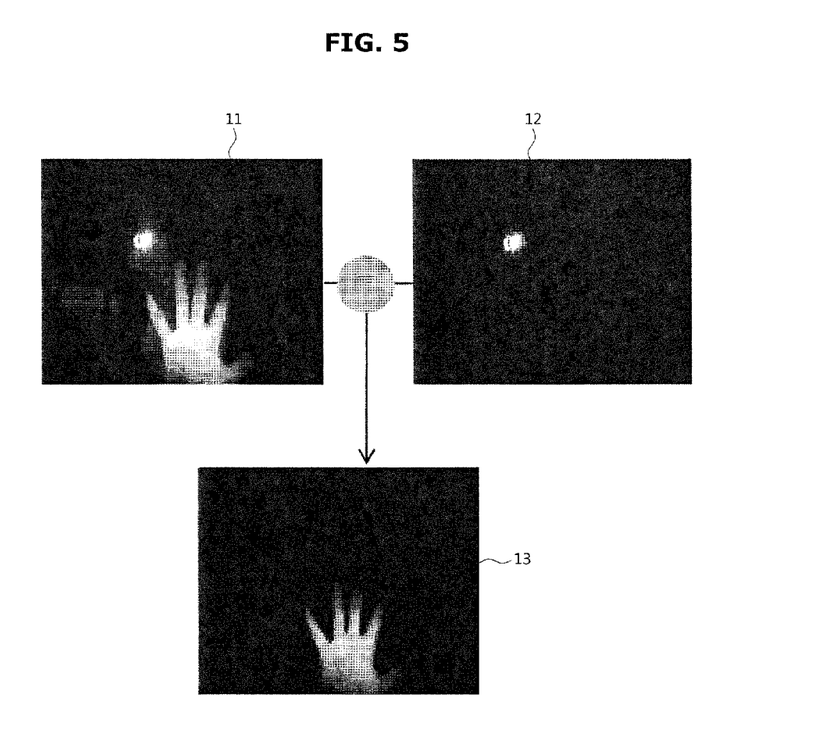
FIG. 5 is a diagram for describing a method of generating an object image.

FIG. 5 is a diagram for describing a method of generating an object image. In FIG. 5, a first image 11 is generated based on the first image signal output from the first image sensor 140, and a second image 12 is generated based on the second image signal output from the second image sensor 240.

As illustrated in FIG. 5, a clearer hand, as a subject, is displayed in the first image 11, which is generated based on the first image signal acquired in an infrared environment. This is because of reflection characteristics of infrared light. Particularly, since illuminated infrared light is reflected only by the hand disposed within a short distance and is not reflected by the background, the hand as the subject is more clearly displayed in the first image 11.

That is, although the background of the first image 11 is the same as that of the second image 12, a clearer hand is captured as the subject in the first image 11. Thus, the object image generator 440 may generate an object image 13 by removing the background via subtraction of the second image 12 from the first image 11.

The object image 13 from which the background is removed may be used for object recognition. The object image generator 440 may perform an additional processing on the object image 13 for object recognition. For example, the object image generator 440 may perform an additional processing of searching for a pupil of a human body on the object image 13.

A storage unit 450 may store various information related to driving of the image processing apparatus 10. For example, the storage unit 450 may store data directly required for driving of the image processing apparatus 10 such as firmware and applications of the image processing apparatus 10. The storage unit 450 may also store temporary data generated while driving of the image processing apparatus 10.

The storage unit 450 may be a high speed random access memory, magnetic disk, static random access memory (SRAM), dynamic random access memory (DRAM), or read-only memory (ROM), without being limited thereto. Also, the storage unit 450 may detachable from the image processing apparatus 10. For example, the storage unit 450 may include a compact flash (CF) card, a smart media (SD) card, a multimedia card (MMC), a memory stick, and the like.

Figure 6:
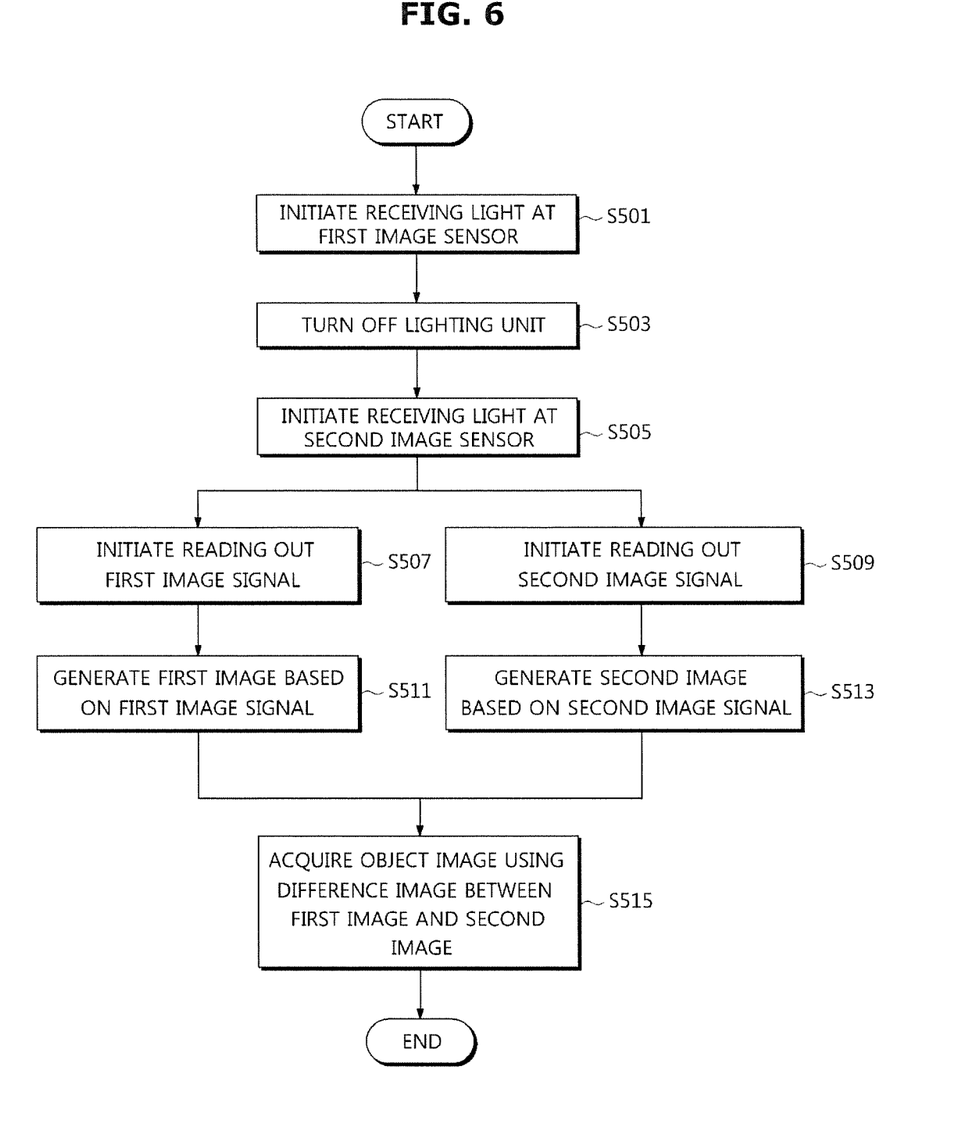
FIG. 6 is a flowchart for describing a method of processing an image in an image processing apparatus according to an exemplary embodiment.
Figure 7:
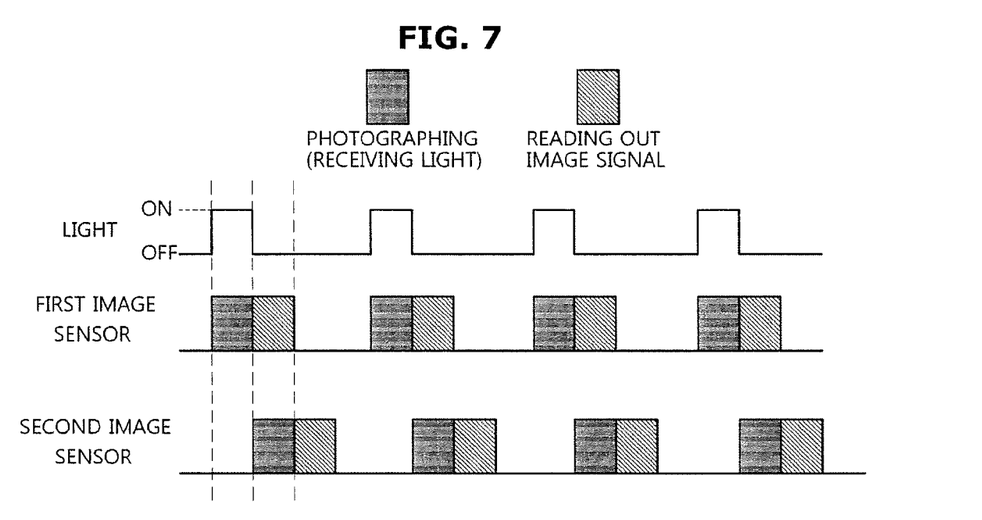
FIG. 7 is a timing diagram for describing an example of a timing control process of an image processing apparatus according to an exemplary embodiment.

FIG. 6 is a flowchart for describing a method of processing an image in an image processing apparatus according to an exemplary embodiment. FIG. 7 is a timing diagram for describing an example of a timing control process of an image processing apparatus according to an exemplary embodiment.

Referring to FIGS. 2 and 6, the controller 400 controls the first image sensor 140 to initiate receiving light (S501). Particularly, the timing controller 410 controls the first drive unit 120 to open the shutter of the first optical unit 110. When the shutter of the first drive unit 120 is opened, light is incident on the first image sensor 140. The light incident on the first image sensor 140 is infrared light filtered by the first filter unit 130.

In addition, the controller 400 may control the lighting unit 300 to emit light to the object when the first image sensor 140 initiates receiving light and control the first image sensor 140 to initiate receiving light as illustrated in FIG. 7.

Particularly, the controller 400 may output a control signal to the lighting unit 300 to emit light to the object and may generate a command for the first image sensor 140 to initiate the receiving of light and transmit the generated command to the sensor controller 420. The sensor controller 420 may control the first image sensor 140 to receive incident light in accordance with the command to initiate the receiving of light and to convert the received light into an electric signal, i.e., the first image signal.

The controller 400 may control the lighting unit 300 to be turned off (S503). The controller 400 may change the state of the lighting unit 300 according to predetermined conditions. In this case, the predetermined conditions may be determined based on a light receiving time period of the first image sensor 140. For example, when the lighting unit 300 is set to emit light only while the first image sensor 140 receives light as illustrated in FIG. 7, the timing controller 410 may control the lighting unit 300 to be turned off at a time when the receiving of light of the first image sensor 140 is terminated.

Also, the timing controller 410 may control the first drive unit 120 to close the shutter of the first optical unit 110 when the receiving of light of the first image sensor 140 is terminated.

The controller 400 controls the second image sensor 240 to initiate receiving light (S505). When the lighting unit 300 is turned off, the timing controller 410 controls the second drive unit 220 to open the shutter of the second optical unit 210 such that the second image sensor 240 initiates receiving light.

Accordingly, light is incident on the second image sensor 240.

In addition, the timing controller 410 may create a command for the second image sensor 240 to initiate receiving light and transmit the created command to the sensor controller 420 as illustrated in FIG. 6. The sensor controller 420 may control the second image sensor 240 to receive incident light in accordance with the command to initiate the receiving of light and to convert the received light into an electric signal, i.e., the second image signal.

The controller 400 controls the first image sensor 140 to initiate reading out the first image signal (S507). As illustrated in FIG. 7, the timing controller 410 may create a command to initiate the readout operation such that the first image sensor 140 reads out the first image signal when the receiving of light of the first image sensor 140 is terminated and may transmit the created command to the sensor controller 420. The sensor controller 420 may control the first image sensor 140 such that the readout circuit reads out the first image signal on a pixel basis or on a line basis.

Meanwhile, the controller 400 controls the second image sensor 240 to initiate reading out the second image signal (S509). As illustrated in FIG. 7, when the receiving of light of the second image sensor 240 is terminated, the timing controller 410 creates a command to initiate the reading out of the second image signal and transmits the created command to the sensor controller 420. The sensor controller 420 may control the second image sensor 240 such that the readout circuit reads out the second image signal on the pixel basis or on the line basis.

The timing controller 410 may control the second drive unit 220 to close the shutter of the second optical unit 210 when the receiving of light of the second image sensor 240 is terminated.

The controller 400 generates a first image based on the first image signal (S511). When the reading out of the first image signal is terminated, the image processor 430 generates the first image based on the first image signal read out and output from the first image sensor 140 and transmits the first image to the object image generator 440.

The controller 400 generates a second image based on the second image signal (S513). When the reading out of the second image signal is terminated, the image processor 430 generates the second image based on the second image signal read out and output from the second image sensor 240 and transmits the second image to the object image generator 440.

The controller 400 acquires an object image by using a difference image between the first image and the second image (S515). Particularly, the object image generator 440 generates the object image by removing the background from the first image via subtraction of the second image from the first image.

The generated object image may be used for object recognition. The object image generator 440 may perform an additional processing on the object image for object recognition. For example, the object image generator 440 may perform an additional processing of searching for a pupil of a human body on the object image.

As illustrated in FIG. 7, the controller 400 may acquire object images by repeatedly performing operations S501 to S515 at every predetermined period T. The sequentially acquired object images may be used to monitor the object.

Meanwhile, although operations S505 to S509 are simultaneously performed referring to FIG. 7, embodiments of the present disclosure are not limited thereto. Hereinafter, another example of a timing control process of the image processing apparatus 10 will be described in detail.

Figure 8:
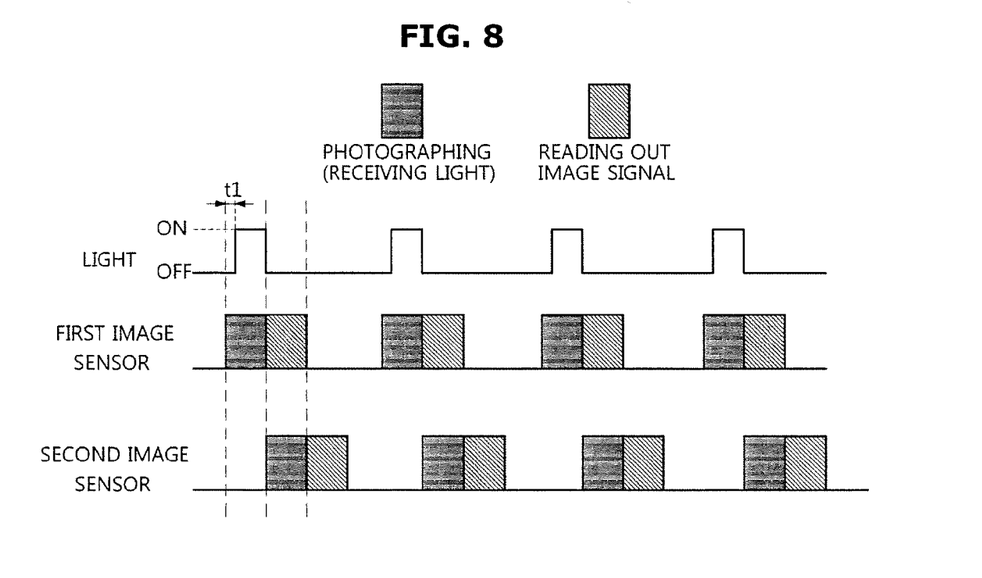
FIG. 8 is a timing diagram for describing another example of a timing control process of an image processing apparatus according to an exemplary embodiment.
Figure 9:
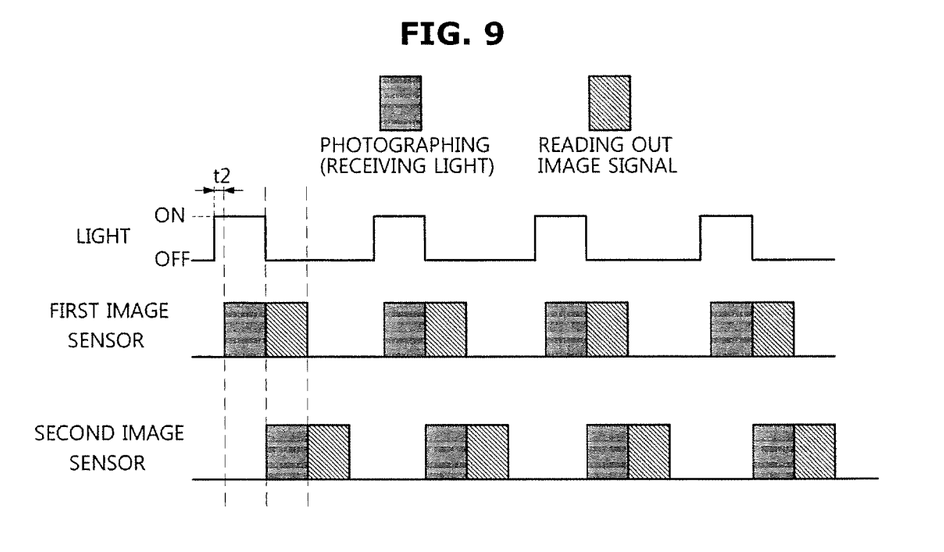
FIG. 9 is a timing diagram for describing another example of a timing control process of an image processing apparatus according to an exemplary embodiment.

FIG. 8 is a timing diagram for describing another example of the timing control process of the image processing apparatus. FIG. 9 is a timing diagram for describing another example of the timing control process of the image processing apparatus.

Although the timing controller 410 controls the lighting unit 300 to initiate emitting light when the first image sensor 140 initiates receiving light referring to FIG. 7, a start time of emitting light of the lighting unit 300 and a start time of receiving light of the first image sensor 140 may be different from each other.

For example, the timing controller 410 may control the lighting unit 300 to initiate emitting light after a first time period t1 since the first image sensor 140 initiated receiving light as illustrated in FIG. 8.

Also, the timing controller 410 may control the lighting unit 300 to emit light before the first image sensor 140 initiate receiving light as illustrated in FIG. 9. Particularly, the timing controller 410 may control the first image sensor 140 to initiate receiving light after a second time period t2 since the lighting unit 300 initiated emitting light.

Figure 10:
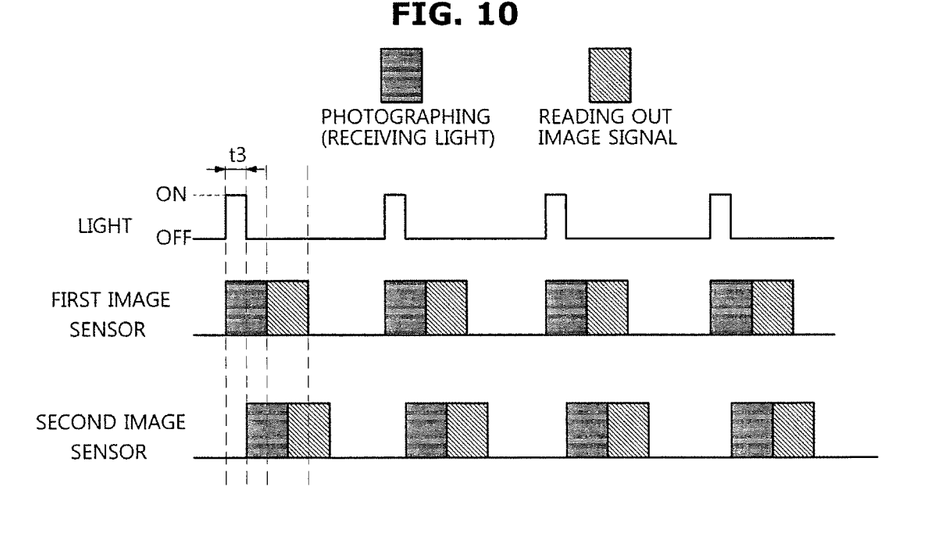
FIG. 10 is a timing diagram for describing another example of a timing control process of an image processing apparatus according to an exemplary embodiment.
Figure 11:
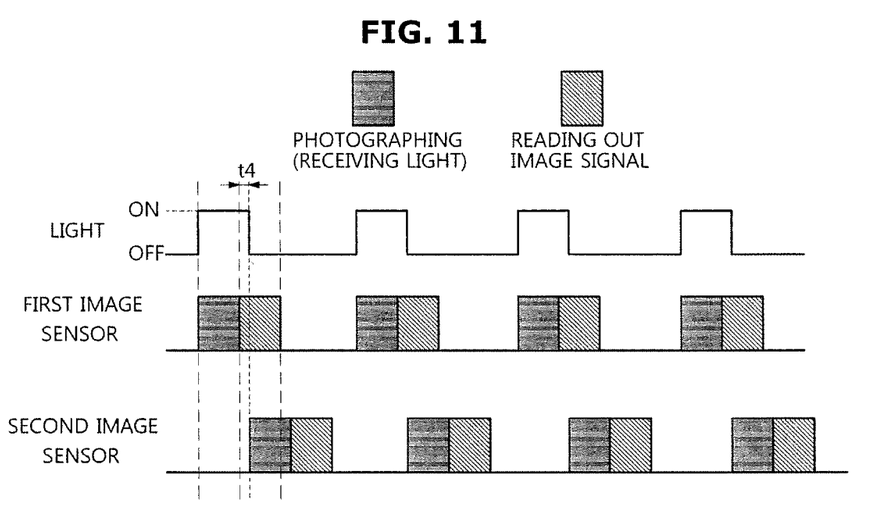
FIG. 11 is a timing diagram for describing another example of a timing control process of an image processing apparatus according to an exemplary embodiment.

FIG. 10 is a timing diagram for describing another example of the timing control process of the image processing apparatus. FIG. 11 is a timing diagram for describing another example of the timing control process of the image processing apparatus.

Meanwhile, although the timing controller 410 controls the lighting unit 300 to terminate the emitting of light when the first image sensor 140 terminates the receiving of light referring to FIG. 7, an end time of emitting light of the lighting unit 300 and an end time of receiving light of the first image sensor 140 may be different from each other.

For example, the timing controller 410 may turn off the lighting unit 300 such that light is not emitted to the object before the first image sensor 140 terminates the receiving of light as illustrated in FIG. 10. Particularly, the lighting unit 300 may be turned off after a predetermined time period since the emitting of light was initiated. When the lighting unit 300 is turned off as described above, the first image sensor 140 may receive light in a non-lighting environment for a third time period t3.

In addition, the timing controller 410 may turn off the lighting unit 300 after a fourth time period t4 since the second image sensor 240 terminated the receiving of light as illustrated in FIG. 11.

Meanwhile, although the timing controller 410 controls the second image sensor 240 to initiate receiving light when the first image sensor 140 initiate reading out the first image signal referring to FIG. 7, a start time of receiving light of the second image sensor 240 is not limited thereto.

For example, the second image sensor 240 may initiate receiving light even before the first image sensor 140 terminates the receiving of light as illustrated in FIG. 10. As described above, the first image sensor 140 acquires an image signal in a lighting environment, and the second image sensor 240 acquires an image signal in a non-lighting environment.

Thus, the second image sensor 240 may initiate receiving light at any time after the lighting unit 300 is turned off. That is, the first image sensor 140 and the second image sensor 240 simultaneously receive light for the third time period t3.

In addition, the second image sensor 240 may initiate receiving light after the first image sensor 140 terminates the receiving of light as illustrated in FIG. 11. That is, since the second image sensor 240 needs to acquire an image signal in a non-lighting environment, the second image sensor 240 initiates receiving light after the lighting unit 300 is turned off. Thus, the second image sensor 240 may initiate receiving light after the fourth time period t4.

As described above, as a difference between the time of acquiring the first image and the time of acquiring the second image decreases, the controller 400 may acquire a clearer object image. Thus, the timing controller 410 may select an end time of emitting light of the lighting unit 300 such that a difference between a start time of receiving light of the first image sensor 140 and a start time of receiving light of the second image sensor 240 is minimized.

In addition, the timing controller 410 may minimize a difference between a time of acquiring the first image signal and a time of acquiring the second image signal by controlling the second image sensor 240 to receive light when the lighting unit 300 terminates emitting light.

Figure 12:
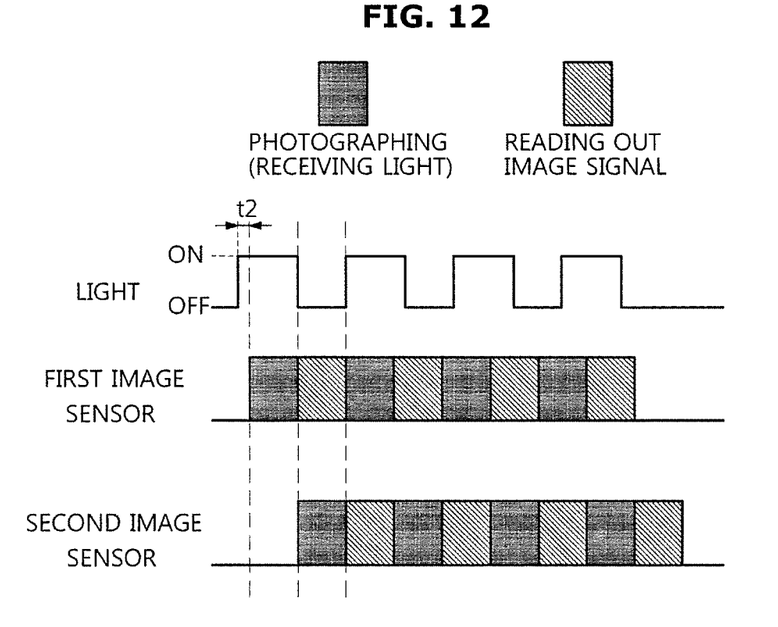
FIG. 12 is a timing diagram for describing another example of a timing control process of an image processing apparatus according to an exemplary embodiment.

FIG. 12 is a timing diagram for describing another example of the timing control process of the image processing apparatus.

Meanwhile, although object images are acquired at every period T referring to FIG. 7, the period T may be reduced as illustrated in FIG. 12.

As illustrated in FIG. 12, the timing controller 410 may control a start time of emitting light, a start time of receiving light, and a start time of reading out image signal such that a readout operation of the first image sensor 140 and a light receiving operation of the second image sensor 240 are simultaneously performed, and a light receiving operation of the first image sensor 140 and a readout operation of the second image sensor 240 are simultaneously performed.

As is apparent from the above description, according to an apparatus and method of processing an image according to an exemplary embodiment, the background may be efficiently removed even when the object moves since the first image signal and the second image signal are acquired at a short time interval via the plurality of image capturing units.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image processing apparatus comprising:
   a light configured to emit light to an object;
   a first imager configured to output a first image signal acquired by photographing the object when light is emitted by the light;
   a second imager configured to output a second image signal acquired by photographing the object when no light is emitted by the light; and
   a controller configured to acquire an object image by using a difference image between a first image generated based on the first image signal and a second image generated based on the second image signal,
   wherein the first imager generates the first image signal by receiving light including the light originated from the light for a first time period, and the second imager generates the second image signal by receiving light including no light originated from the light for a second time period, wherein an irradiation time of the light differs from the first time period, and wherein the second time period starts when the irradiation time of the light ends.

2. The image processing apparatus according to claim 1, wherein the lighting emits light to the object only for a part of the first time period.

3. The image processing apparatus according to claim 1, wherein the light does not emit light for the second time period during which the second imager receives light.

4. The image processing apparatus according to claim 1, wherein the first imager reads out the first image signal generated by receiving light for the first time period and outputs the first image signal.

5. The image processing apparatus according to claim 4, wherein the reading out of the first image signal of the first imager and the receiving of light of the second imager are simultaneously performed.

6. The image processing apparatus according to claim 4, wherein the first imager reads out the first image signal when the second imager receives light for the second time period.

7. The image processing apparatus according to claim 1, wherein the controller controls a light emitting timing of the light to sequentially perform the receiving of light of the first imager and the receiving of light of the second imager.

8. The image processing apparatus according to claim 1, wherein the light is infrared light.

9. The image processing apparatus according to claim 8, wherein the first imager and the second imager comprise at least one selected from the group consisting of an infrared filter and an infrared film.

10. A method of processing an image for object recognition by using a plurality of image sensors, the method comprising:

generating a first image signal of an object by receiving light while a light emits light to the object at a first image sensor;

generating a second image signal of the object by receiving light while the light is turned off at a second image sensor; and acquiring an object image from which a background is removed based on the first image signal and the second image signal, wherein the first imager generates the first image signal by receiving light including the light originated from the light for a first time period, and the second imager generates the second image signal by receiving light including no light originated from the light for a second time period, wherein an irradiation time of the light differs from a light reception time of the first image sensor, and wherein a light reception time of the second image sensor starts when the irradiation time of the light ends.

11. The method according to claim 10, wherein the acquiring of the object image comprises:

generating a first image based on the first image signal;

generating a second image based on the second image signal; and acquiring the object image by using a difference image between the first image and the second image.

12. The method according to claim 10, wherein the generating of the first image comprises turning on the light.

13. The method according to claim 10, wherein the generating of the first image comprises turning off the light.

14. The method according to claim 10, wherein the generating of the first image signal comprises reading out the first image signal at the first image sensor.

15. The method according to claim 14, wherein the reading out of the first image signal at the first image sensor and the receiving of light at the second image sensor are simultaneously performed.

16. The method according to claim 10, wherein the generating of the second image signal comprises reading out the second image signal at the second image sensor.

17. The method according to claim 14, wherein the reading out of the second image signal at the second image sensor and the receiving of light at the first image sensor are simultaneously performed.

18. The method according to claim 14, wherein the light is infrared light.

19. The method according to claim 18, wherein the generating of the first image signal further comprises selecting infrared light received by the first image sensor by using an infrared filer or an infrared film, and the generating of the second image signal further comprises selecting infrared light received by the first image sensor by using an infrared filer or an infrared film.

* * * * *